US012662410B2

(12) United States Patent
Brown et al.

(10) Patent No.: US 12,662,410 B2
(45) Date of Patent: Jun. 23, 2026

(54) APPARATUS AND METHODS FOR SEPARATING EDGE PORTIONS FROM A GLASS RIBBON

(71) Applicant: CORNING INCORPORATED, Corning, NY (US)

(72) Inventors: James William Brown, The Villages, FL (US); Anping Liu, Horseheads, NY (US); Ching Yao Wang, Taichung City (TW); Naiyue Zhou, Leland, NC (US)

(73) Assignee: CORNING INCORPORATED, Corning, NY (US)

( * ) Notice: Subject to any disclaimer, the term of this patent is extended or adjusted under 35 U.S.C. 154(b) by 166 days.

(21) Appl. No.: 18/559,895

(22) PCT Filed: Jul. 8, 2022

(86) PCT No.: PCT/US2022/036489
§ 371 (c)(1),
(2) Date: Nov. 9, 2023

(87) PCT Pub. No.: WO2023/003703
PCT Pub. Date: Jan. 26, 2023

(65) Prior Publication Data
US 2025/0074810 A1 Mar. 6, 2025

Related U.S. Application Data

(60) Provisional application No. 63/223,736, filed on Jul. 20, 2021.

(51) Int. Cl.
*C03B 33/02* (2006.01)
*C03B 17/06* (2006.01)

(52) U.S. Cl.
CPC ........ *C03B 33/0215* (2013.01); *C03B 17/064* (2013.01); *C03B 33/0222* (2013.01)

(58) Field of Classification Search
None
See application file for complete search history.

(56) References Cited

U.S. PATENT DOCUMENTS

| | | | | | |
|---|---|---|---|---|---|
| 1,861,665 | A | * | 6/1932 | Owen | C03B 35/167 |
| | | | | | 198/782 |
| 4,749,400 | A | * | 6/1988 | Mouly | C03B 21/02 |
| | | | | | 65/70 |

(Continued)

FOREIGN PATENT DOCUMENTS

| | | | | | |
|---|---|---|---|---|---|
| EP | 1048621 | A2 | * | 11/2000 | C03B 17/06 |
| JP | 58-104030 | A | | 6/1983 | |

(Continued)

OTHER PUBLICATIONS

International Search Report and Written Opinion of the International Searching Authority; PCT/US2022/036489; mailed on Nov. 3, 2022, 9 pages; European Patent Office.

*Primary Examiner* — Jodi C Franklin

(57) ABSTRACT

A glass manufacturing apparatus including a forming apparatus, the forming apparatus including an edge separation assembly. The edge separation assembly includes a scoring device with a scoring tool coupled thereto, a backing roller, a pair of stabilizing rollers configured to pinch a central portion of the glass ribbon therebetween, and a separation roller configured to apply a separation force against an edge portion of the glass ribbon to separate the edge portion from the central portion. The edge separation apparatus may further include a first plurality of guide rollers arranged to direct the separated edge portion away from the central portion and a second plurality of guide rollers configured to guide the central portion. The forming apparatus further includes a cross-cut assembly configured to separate a glass sheet from the central portion.

11 Claims, 10 Drawing Sheets

(56) References Cited

U.S. PATENT DOCUMENTS

| | | | | |
|---|---|---|---|---|
| 6,502,423 | B1 * | 1/2003 | Ostendarp | C03B 17/068 |
| | | | | 65/176 |
| 6,758,064 | B1 * | 7/2004 | Kariya | C03B 17/06 |
| | | | | 65/95 |
| 7,032,320 | B2 * | 4/2006 | Ischdonat | G01L 5/102 |
| | | | | 33/501.02 |
| 8,292,141 | B2 * | 10/2012 | Cox | C03B 33/0215 |
| | | | | 225/104 |
| 8,887,530 | B2 * | 11/2014 | Markham | C03B 21/00 |
| | | | | 65/92 |
| 9,643,878 | B2 * | 5/2017 | Fujii | C03B 23/023 |
| 9,932,259 | B2 * | 4/2018 | Hasegawa | C03B 23/02 |
| 10,870,601 | B2 * | 12/2020 | Bayne | B65G 49/065 |
| 11,155,496 | B2 * | 10/2021 | Lotze | B65H 23/16 |
| 11,760,683 | B2 | 9/2023 | Brown et al. | |
| 2006/0261118 | A1 * | 11/2006 | Cox | B26F 3/002 |
| | | | | 225/96 |

| | | | | |
|---|---|---|---|---|
| 2010/0162758 | A1 * | 7/2010 | Lang | C03B 33/0235 |
| | | | | 65/29.11 |
| 2012/0103018 | A1 | 5/2012 | Lu et al. | |
| 2013/0126576 | A1 * | 5/2013 | Marshall | C03B 33/0235 |
| | | | | 225/2 |
| 2016/0168003 | A1 * | 6/2016 | Hasegawa | C03B 33/0235 |
| | | | | 65/184 |
| 2017/0008794 | A1 | 1/2017 | Jia | |
| 2017/0057860 | A1 * | 3/2017 | Habeck | C03B 21/06 |
| 2017/0369356 | A1 * | 12/2017 | Booth | C03B 33/0235 |
| 2018/0093913 | A1 | 4/2018 | Burdette et al. | |
| 2020/0079679 | A1 * | 3/2020 | Mori | C03B 35/16 |
| 2020/0369551 | A1 * | 11/2020 | Ortner | B23K 26/53 |

FOREIGN PATENT DOCUMENTS

| | | | | |
|---|---|---|---|---|
| WO | WO-2017110348 A1 * | 6/2017 | | C03B 33/02 |
| WO | WO201901403 | * 12/2019 | | C03B 17/06 |

* cited by examiner

APPARATUS AND METHODS FOR SEPARATING EDGE PORTIONS FROM A GLASS RIBBON

CROSS REFERENCE TO RELATED APPLICATIONS

This application claims the benefit of priority under 35 U.S.C. § 119 of U.S. Provisional Application Ser. No. 63/223,736, filed on Jul. 20, 2021, the content of which is relied upon and incorporated herein by reference in its entirety.

FIELD

The present disclosure relates generally to glass manufacturing apparatus and methods and, more particularly, to glass manufacturing apparatus and methods for separating edge portions from a glass ribbon while the ribbon is being drawn from a molten material.

BACKGROUND

It is known to separate a glass ribbon by scoring across a width of the ribbon, then bending the ribbon across the score with a separate handling apparatus to produce a glass sheet. Typically, bending the glass ribbon with the handling apparatus generates unnecessary excess bending stress and/or uneven bending stress within the glass ribbon due in part to un-scored edge portions. Upon separation, such excess and/ or uneven bending stress can produce vibrations, warping, and/or twisting of the glass ribbon that may propagate up the glass ribbon to the viscous zone and/or setting zone and cause defects in the glass ribbon as the glass ribbon is formed. These defects may then be frozen into the glass ribbon in the elastic zone. Edge portions of the glass sheet are removed in downstream finishing processes after the glass sheet is formed.

SUMMARY

The following presents a simplified summary of the disclosure to provide a basic understanding of some embodiments described in the detailed description. These and other features, aspects and advantages are better understood when the following detailed description is read with reference to the accompanying drawings.

In accordance with various embodiments, a glass manufacturing apparatus is disclosed comprising a forming body configured to form a glass ribbon that descends from the forming body in a draw direction along a draw path lying in a draw plane, an edge separation assembly positioned below the forming body, the edge separation assembly configured to separate an edge portion of the glass ribbon from a central portion of the glass ribbon. The edge separation assembly can comprise a scoring device positioned below the forming body and configured to form a first score in the glass ribbon along a length of the glass ribbon in the draw direction. The scoring device may be movable relative to the draw plane.

In embodiments, the edge separation assembly may further comprise a separation roller positioned downstream of the scoring device and configured to apply a force to an edge portion of the glass ribbon outboard of the first score and separate the edge portion from a central portion of the glass ribbon. In various embodiments, the edge separation assembly may further include a pair of stabilizing rollers positioned proximate the separation roller and arranged to pinch a central portion of the glass ribbon inboard of the first score between the pair of stabilizing rollers. In some embodiments, at least one stabilizing roller of the pair of stabilizing rollers may be movable in a direction perpendicular to the draw direction. Each stabilizing roller of the pair of stabilizing rollers comprises an axis of rotation. The stabilizing roller axes may be parallel to each other. An axis of rotation of the separation roller can be positioned downstream of the first horizontal plane and may be parallel with one or more of the axes of rotation of the stabilizing rollers. The axis of rotation of the separation roller can be rotatable in the second horizontal plane.

In some embodiments, the glass manufacturing apparatus may further comprise a first plurality of guide rollers positioned below the separation roller and arranged to guide the separated edge portion along a second path different from the draw path. The first plurality of guide rollers may be movable in a direction perpendicular to the draw direction. For example, each guide roller of the first plurality of guide rollers is coupled to an actuator.

In some embodiments, the glass manufacturing apparatus may further comprise a second scoring apparatus positioned downstream of the first scoring apparatus, the second scoring apparatus configured to create a second score across a width of the central portion perpendicular to the draw direction.

In some embodiments, the glass manufacturing apparatus may further comprise a chute configured to direct the separated edge portion to a collection container positioned below the chute.

In other embodiments, a method of separating an edge portion from a moving glass ribbon is described, comprising forming a glass ribbon with a forming apparatus, the glass ribbon moving along a draw path in a draw direction along a draw plane, the glass ribbon comprising a central portion comprising a first thickness and a first edge portion including an outside edge of the glass ribbon, the first edge portion adjacent the central portion and comprising a second thickness greater than the first thickness.

The method may further comprise scoring the glass ribbon with a scoring tool while supporting the second major surface opposite the scoring tool with a backing roller, the scoring tool forming a score in the glass ribbon along a length of the glass ribbon substantially parallel with the draw direction a predetermined distance from the outside edge. The method may still further comprise pinching the central portion of the glass ribbon during the scoring between a pair of stabilizing rollers adjacent the score and contacting the edge portion of the glass ribbon downstream of the scoring tool with a separation roller, the separation roller applying a force that forms a tensile stress across the score and causes the edge portion to separate from the central portion downstream of the scoring tool.

In some embodiments, the method may further comprise contacting the separated edge portion with a first plurality of guide rollers and guiding the edge portion away from the central portion. For example, the first plurality of guide rollers may be used to guide the separated edge portion into a chute, wherein the chute directs the separated edge portion into a collection container.

In some embodiments, the method may comprise contacting the central portion with a second plurality of guide rollers arranged adjacent the draw plane in the draw direction.

In various embodiments, the method may include cross cutting the central portion to separate a glass sheet from the central portion.

DETAILED DESCRIPTION

Figure 1:
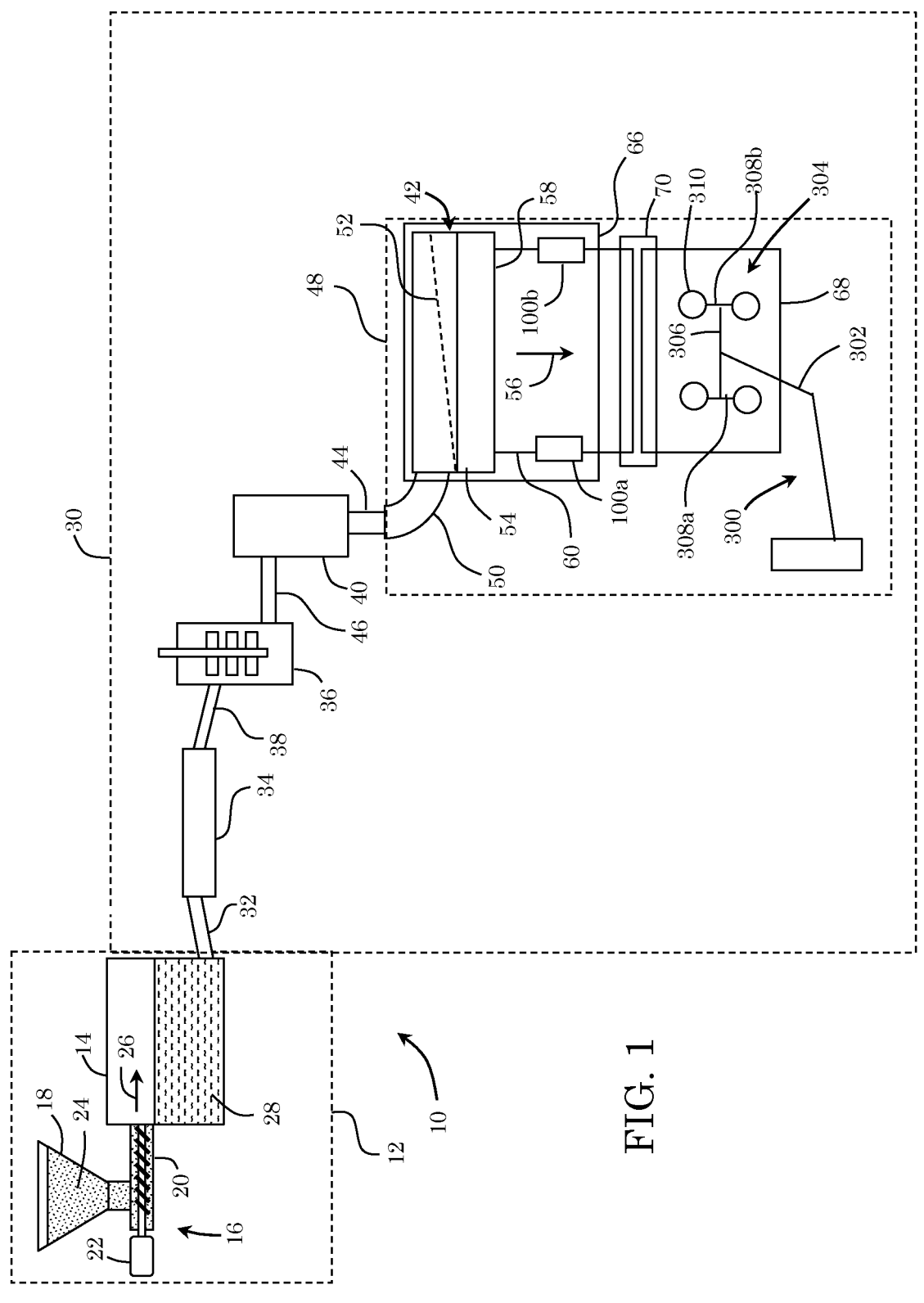
FIG. 1 is a schematic view of an exemplary glass making apparatus according to embodiments of the present disclosure.

Reference will now be made in detail to embodiments of the present disclosure, examples of which are illustrated in the accompanying drawings. Whenever possible, the same reference numerals will be used throughout the drawings to refer to the same or like parts. However, this disclosure can be embodied in many different forms and should not be construed as limited to the embodiments set forth herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Ranges can be expressed herein as from "about" one particular value, and/or to "about" another particular value. When such a range is expressed, another embodiment includes from the one particular value to the other particular value. Similarly, when values are expressed as approximations by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner. It can be appreciated that a myriad of additional or alternate examples of varying scope could have been presented but have been omitted for purposes of brevity.

As used herein, the terms "comprising" and "including," and variations thereof, shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, "refractory" refers to non-metallic materials having chemical and physical properties making them applicable for structures, or as components of systems, that are exposed to environments above 538° C.

Shown in FIG. 1 is an exemplary glass manufacturing apparatus 10. The glass manufacturing apparatus 10 comprises a glass melting furnace 12 including a melting vessel 14. In addition to melting vessel 14, glass melting furnace 12 can optionally include one or more additional components such as heating elements (e.g., combustion burners and/or electrodes) configured to heat raw material and convert the raw material into a molten material, hereinafter, molten glass. For example, melting vessel 14 may be an electrically-boosted melting vessel, wherein energy is added to the raw material through both combustion burners and by direct heating, wherein an electrical current is passed through the raw material, the electrical current thereby adding energy via Joule heating of the raw material.

In further embodiments, glass melting furnace 12 can include other thermal management devices (e.g., thermal insulation components) that reduce heat loss from the melting vessel. In still further embodiments, glass melting furnace 12 can include electronic and/or electromechanical devices that facilitate melting of the raw material into a glass melt. Glass melting furnace 12 can include support structures (e.g., support chassis, support member, etc.) or other components.

Melting vessel 14 can be formed from a refractory material, for example a refractory ceramic material comprising alumina or zirconia, although the refractory ceramic material can comprise other refractory materials, such as yttrium (e.g., yttria, yttria-stabilized zirconia, yttrium phosphate), zircon (ZrSiO4) or alumina-zirconia-silica or even chrome oxide, used either alternatively or in any combination. In some examples, melting vessel 14 may be constructed from refractory ceramic bricks.

In some embodiments, glass melting furnace 12 can be incorporated as a component of a glass manufacturing apparatus configured to fabricate a glass article, for example a glass ribbon, although in further embodiments, the glass manufacturing apparatus can be configured to form other glass articles without limitation, such as glass rods, glass tubes, glass envelopes (for example, glass envelopes for lighting devices, e.g., light bulbs) and glass lenses, although many other glass articles are contemplated. In some examples, melting furnace 12 may be included in a glass manufacturing apparatus comprising a slot draw apparatus, a float bath apparatus, a down-draw apparatus (e.g., a fusion down draw apparatus), an up-draw apparatus, a pressing apparatus, a rolling apparatus, a tube drawing apparatus or any other glass manufacturing apparatus that would benefit from the present disclosure. By way of example, FIG. 1 schematically illustrates glass melting furnace 12 as a component of a fusion down-draw glass manufacturing apparatus 10 for fusion drawing a glass ribbon for subsequent processing into individual glass sheets or rolling the glass ribbon onto a spool. As used herein, fusion drawing comprises flowing molten glass over inclined, e.g., converging, side surfaces of a forming body, wherein the resulting streams of molten material join, or "fuse," at the bottom of the forming body to form a ribbon.

Glass manufacturing apparatus 10 can optionally include an upstream glass manufacturing apparatus 16 positioned upstream of melting vessel 14. In some examples, a portion of, or the entire upstream glass manufacturing apparatus 16, can be incorporated as part of the glass melting furnace 12.

As shown in the embodiment illustrated in FIG. 1, upstream glass manufacturing apparatus 16 can include a raw material storage bin 18, a raw material delivery device 20, and a motor 22 connected to raw material delivery device 20. Raw material storage bin 18 can be configured to store raw material 24 that can be fed into melting vessel 14 of glass melting furnace 12 through one or more feed ports, as indicated by arrow 26. Raw material 24 typically comprises one or more glass forming metal oxides and one or more modifying agents. In some examples, raw material delivery device 20 can be powered by motor 22 to deliver a predetermined amount of raw material 24 from raw material storage bin 18 to melting vessel 14. In further examples, motor 22 can power raw material delivery device 20 to introduce raw material 24 at a controlled rate based on a level of molten glass sensed downstream from melting vessel 14 relative to a flow direction of the molten glass. Raw material 24 within melting vessel 14 can thereafter be heated to form molten glass 28. Typically, the raw material is added to the melting vessel as particulate, for example as various "sands." Raw material 24 can also include scrap glass (i.e., cullet) from previous melting and/or forming operations. Combustion burners can be used to begin the melting process. In an electrically boosted melting process, once the electrical resistance of the raw material is sufficiently reduced by the combustion burners, electric boost can begin by developing an electrical potential between electrodes positioned in contact with the raw material, thereby establishing an electrical current through the raw material, the raw material typically entering, or in, a molten state.

Glass manufacturing apparatus 10 can also include a downstream glass manufacturing apparatus 30 positioned downstream of glass melting furnace 12 relative to a flow direction of molten glass 28. In some examples, a portion of downstream glass manufacturing apparatus 30 may be incorporated as part of glass melting furnace 12. However, in some instances, first connecting conduit 32 discussed below, or other portions of the downstream glass manufacturing apparatus 30, can be incorporated as part of the glass melting furnace 12.

Downstream glass manufacturing apparatus 30 can include a first conditioning chamber, such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of an interior pathway of first connecting conduit 32. Accordingly, first connecting conduit 32 provides a flow path for molten glass 28 from melting vessel 14 to fining vessel 34. However, other conditioning chambers may be positioned downstream of melting vessel 14, for example between melting vessel 14 and fining vessel 34. In some embodiments, a conditioning chamber can be employed between the melting vessel and the fining chamber. For example, molten glass from a primary melting vessel can be further heated in a secondary melting (conditioning) vessel or cooled in the secondary melting vessel to a temperature lower than the temperature of the molten glass in the primary melting vessel before entering the fining chamber.

Bubbles may be removed from molten glass 28 by various techniques. For example, raw material 24 may include multivalent compounds (i.e., fining agents) such as tin oxide that, when heated, undergo a chemical reduction reaction and release oxygen. Other suitable fining agents can include without limitation arsenic, antimony, iron, and/or cerium, although the use of arsenic and antimony, owing to their toxicity, may be discouraged for environmental reasons in some applications. Fining vessel 34 is heated, for example to a temperature greater than the melting vessel interior temperature, thereby heating the fining agent. Oxygen produced by the temperature-induced chemical reduction of one or more fining agents included in the molten glass can diffuse into gas bubbles produced during the melting process. The enlarged gas bubbles with increased buoyancy then rise to a free surface of the molten glass within the fining vessel and can thereafter be vented from the fining vessel, for example through a vent tube in fluid communication with the atmosphere above the free surface.

The downstream glass manufacturing apparatus 30 may further include another conditioning chamber, such as mixing apparatus 36, for example a stirring vessel, for mixing the molten glass that flows downstream from fining vessel 34. Mixing apparatus 36 can be used to provide a homogenous glass melt composition, thereby reducing chemical and/or thermal inhomogeneities that may otherwise exist within the molten glass exiting the fining vessel. As shown, fining vessel 34 may be coupled to mixing apparatus 36 by way of a second connecting conduit 38. Accordingly, molten glass 28 can be gravity fed from the fining vessel 34 to mixing apparatus 36 through an interior pathway of second connecting conduit 38. For instance, gravity may drive molten glass 28 from fining vessel 34 to mixing apparatus 36. Typically, the molten glass within mixing apparatus 36 includes a free surface, with a free (e.g., gaseous) volume extending between the free surface and a top of the mixing apparatus. While mixing apparatus 36 is shown downstream of fining vessel 34 relative to a flow direction of molten glass 28, mixing apparatus 36 may be positioned upstream from fining vessel 34 in other embodiments. In some embodiments, downstream glass manufacturing apparatus 30 may include multiple mixing apparatus, for example a mixing apparatus upstream from fining vessel 34 and a mixing apparatus downstream from fining vessel 34. When used, multiple mixing apparatus may be of the same design, or they may be of a different design from one another. In some embodiments, one or more of the vessels and/or conduits can include static mixing vanes positioned therein to promote mixing and subsequent homogenization of the molten material.

Downstream glass manufacturing apparatus 30 can further include another conditioning chamber such as delivery vessel 40 located downstream from mixing apparatus 36. Delivery vessel 40 can act as an accumulator and/or flow controller to adjust and/or provide a consistent flow of molten glass 28 to forming body 42 by way of exit conduit 44. The molten glass within delivery vessel 40 can, in some embodiments, include a free surface, wherein a free volume extends upward from the free surface to a top of the delivery vessel. As shown, mixing apparatus 36 can be coupled to delivery vessel 40 by way of third connecting conduit 46. In some examples, molten glass 28 can be gravity fed from mixing apparatus 36 to delivery vessel 40 through an interior pathway of third connecting conduit 46.

Figure 2:
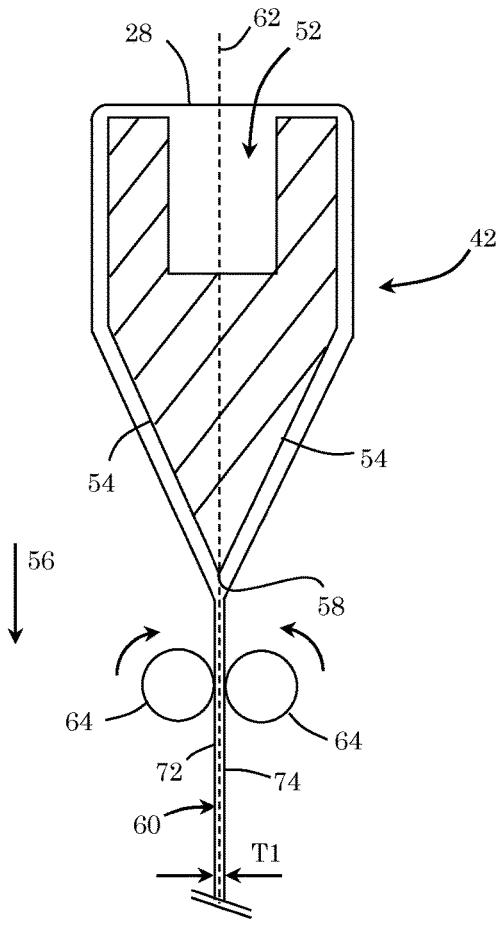
FIG. 2 is a cross-sectional view of a forming body configured to form a glass ribbon.

Downstream glass manufacturing apparatus 30 can further include forming apparatus 48 comprising the above-referenced forming body 42, including inlet conduit 50. Exit conduit 44 can be positioned to deliver molten glass 28 from delivery vessel 40 to inlet conduit 50 of forming apparatus 48. Forming body 42 in a fusion down-draw glass making apparatus can comprise a trough 52 positioned in an upper surface of the forming body, and opposing converging forming surfaces 54 that converge in a draw direction 56 along a bottom edge (root) 58 of the forming body. Molten glass delivered to forming body trough 52 via delivery vessel 40, exit conduit 44 and inlet conduit 50 overflows the walls of trough 52 and descends along the converging forming surfaces 54 as separate flows of molten glass. The separate flows of molten glass join below and along the root 58 to produce a ribbon 60 of molten glass that is drawn along a draw path in a draw plane 62 (see FIG. 2) in draw direction 56 from root 58 by applying a downward tension to the glass ribbon, such as by gravity and/or counter-rotating and opposing pulling rolls 64 (See FIG. 2). The downward tension and the temperature of the molten material can be used to control dimensions of the ribbon (hereafter glass ribbon) as the molten material cools and a viscosity of the material increases. Accordingly, glass ribbon 60 goes through a viscosity transition, from a viscous state, to viscoelastic state, to an elastic state and acquires mechanical properties that give glass ribbon 60 stable dimensional characteristics.

Components of downstream glass manufacturing apparatus 30, including any one or more of connecting conduits 32, 38, 46, fining vessel 34, mixing apparatus 36, delivery vessel 40, exit conduit 44, or inlet conduit 50 may be formed from a precious metal. Suitable precious metals include platinum group metals selected from the group consisting of platinum, iridium, rhodium, osmium, ruthenium and palladium, or alloys thereof. For example, downstream components of the glass manufacturing apparatus may be formed from a platinum-rhodium alloy including from about 70% to about 90% by weight platinum and about 10% to about 30% by weight rhodium. However, other suitable metals for forming downstream components of the glass manufacturing apparatus can include molybdenum, rhenium, tantalum, titanium, tungsten, and alloys thereof.

To ensure the glass forming environment remains stable during the forming process, forming body 42 and at least a portion of the glass ribbon travel path below the forming body can be contained within an enclosure 66 with an open bottom. Enclosure 66 provides a controlled environment through which the glass ribbon travels as the glass ribbon descends from the forming body and cools.

Glass ribbon 60 may, in some embodiments, be separated into individual glass sheets 68 by a glass separation apparatus 70. In other embodiments, the glass ribbon may be wound onto spools and stored for further processing.

Although components of glass manufacturing apparatus 10 are shown and described as fusion downdraw glass making components, principles of the present disclosure can be applied to a wide variety of glass making processes. For example, melting vessels according to embodiments of the present disclosure can be used in such diverse glass making processes as fusion processes, slot draw processes, rolling processes, pressing processes, and float processes.

Figure 3:
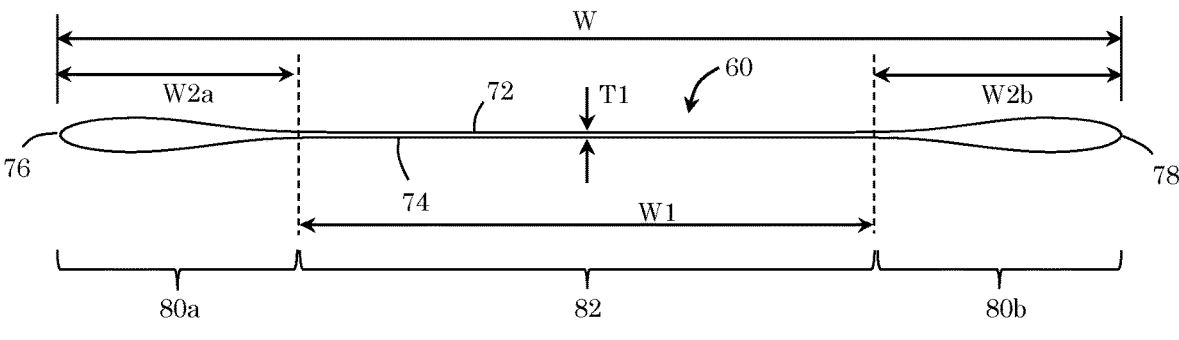
FIG. 3 is a lateral cross-sectional view of a glass ribbon showing enlarged edge portions.

FIG. 3 depicts a cross-sectional view of an exemplary glass ribbon 60 across a width W of the glass ribbon in the elastic viscosity region. Glass ribbon 60 comprises a first major surface 72, a second major surface 74 opposite first major surface 72, a first lateral edge 76 extending along a length of glass ribbon 60 in draw direction 56, and a second lateral edge 78 opposite first lateral edge 76 and also extending along a length of glass ribbon 60 in draw direction 56. Width W extends orthogonal to draw direction 56 between first lateral edge 76 and second lateral edge 78.

As glass ribbon 60 is drawn from forming body 42, glass ribbon width W decreases (attenuates) and the glass ribbon subsequently develops edge portions with a thickness greater than a thickness of the central portion of the glass ribbon. Thus, glass ribbon 60 may comprise a thickened first edge portion 80a including first lateral edge 76, and a thickened second edge portion 80b including second lateral edge 78, relative to thickness T1 of central portion 82 (wherein T1 is defined along a middle longitudinal axis of glass ribbon 60 between first and second lateral edges 76, 78). Central portion 82 extends along a width W1 orthogonal to draw direction 56 between first edge portion 80a and second edge portion 80b. Widths W1a and W1b define those portions of glass ribbon 60 at the edges thereof designated to be removed to yield a central portion of the glass ribbon with a substantially uniform thickness, e.g., thickness T1. Thickness T1 can be in a range from about 0.01 millimeters (mm) to about 3 mm, for example in a range from about 0.05 to about 2.5 mm, in a range from about 0.1 mm to about 2 mm, in a range from about 0.5 to about 1.5 mm First and second edge portions 80a, 80b are typically removed from a glass sheet 68 after the glass sheet is cut from glass ribbon 60. That is, glass sheet 68 is first separated from glass ribbon 60 in a cross-cutting operation, after which first and second thickened edge portions 80a, 80b are removed from the separated glass sheet in an additional downstream cutting process. During the cross-cutting operation, central portion 82 of the glass ribbon is scored, for example orthogonal to draw direction 56, without also scoring first and second edge portions 80a, 80b. Because of their uneven geometry, it can be difficult to perform accurate scoring across the thickened edge portions. Once scoring is complete, a bend can be formed in the glass ribbon across the score, thereby inducing a tensile stress across the score that propagates a crack and separates glass sheet 68 from glass ribbon 60 along width W of the glass ribbon. However, because first and second edge portions 80a, 80b were not scored, the large release of energy when the edge portions break can produce glass particles that adhere to both glass ribbon 60 upstream of the cut and glass sheet 68 downstream of the cut, making cleaning of the glass sheet and a subsequent glass sheet produced from the glass ribbon, difficult. Moreover, the energy release can produce perturbations in the glass ribbon that travel upward through the glass ribbon and cause fluctuations in ribbon thickness in the transition zone between the viscous zone and the elastic zone (i.e., in the viscoelastic zone) that may freeze into the glass ribbon. Additionally, a downstream cutting process consumes factory floor space and adds additional time to the overall glass making process. Accordingly, an apparatus and method for continuous, in-line edge portion removal before cross-cutting of the glass ribbon is described.

As shown in FIGS. 4-8, in an exemplary embodiment forming apparatus 48 comprises an edge portion separation assembly 100 configured to remove edge portions of glass ribbon 60 as the glass ribbon travels from root 58 in draw direction 56. Edge portion separation assembly 100 may include a scoring assembly 102, a backing roller 104, a pair of opposing ribbon stabilizing rollers 106a and 106b, and/or a separation roller 108 configured to apply a separation force to the edge portion that separates the edge portion from glass ribbon 60 downstream of scoring assembly 102. In various embodiments, forming apparatus 48 may include pairs of such components arranged to remove an edge portion from each of the opposing lateral edges of the glass ribbon. The present description, unless otherwise indicated, will describe one such edge portion separation assembly 100 (e.g., first edge separation assembly 100a—see FIG. 1) configured to remove first edge portion 80a from glass ribbon 60, with the understanding that forming apparatus 48 may include a second such edge portion separation assembly 100 (e.g., edge separation assembly 100b—see FIG. 1) positioned laterally opposite first edge portion separation assembly 100a and configured to remove second edge portion 80b from the glass ribbon. Edge portion separation assembly 100b may be similar or identical to edge portion separation assembly 100a.

Figure 4:
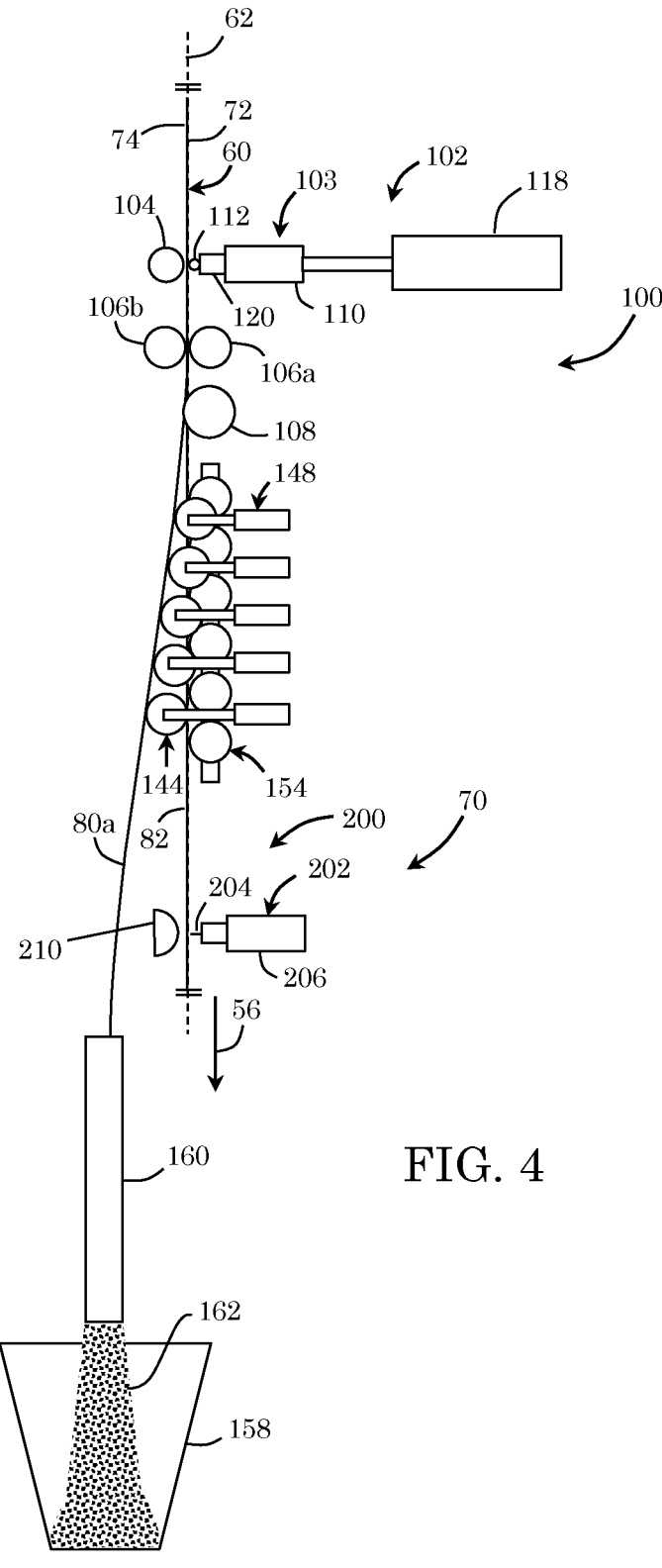
FIG. 4 is a schematic view of a portion of the forming apparatus showing an exemplary edge portion separation assembly.

As shown in FIG. 4, scoring assembly 102 comprises scoring device 103 including a body portion 110 and a scoring tool 112 coupled thereto. Scoring assembly 102 is configured to produce a score 114 (see FIG. 7) in first major surface 72 extending lengthwise along glass ribbon 60 parallel or substantially parallel with draw direction 56. Scoring tool 112 may comprise a mechanical score wheel or scriber, such as a diamond or carbide scriber. For example, in various embodiments, scoring tool 112 can be a score wheel rotatable about an axis of rotation 116. In some embodiments, scoring tool 112 can be configured to move relative to glass ribbon 60, for example toward or away from first surface 72. For example, scoring assembly 102 may comprise a first actuator 118 coupling scoring device 103 to a frame or other support member. First actuator 118 can comprise a pneumatic actuator, e.g., a pneumatic piston, a linear motor, or any other suitable displacement mechanism capable of moving scoring device 103 between a first, extended position, wherein scoring device 103 (e.g., body portion 110 and scoring tool 112), is moved closer to glass ribbon 60, and a second, retracted position, wherein scoring device 103 is moved away from first major surface 72.

Scoring assembly 102 may further comprise a second actuator 120, for example a pneumatic piston, that couples scoring tool 112 to body portion 110 and moves scoring tool 112 relative to body portion 110 toward or away from glass ribbon 60 (e.g., first major surface 72). In various embodiments, second actuator 120 can be configured to move scoring tool 112 a lesser distance and/or at a slower rate of travel than first actuator 118 moves body portion 110. Accordingly, in various embodiments, coarse movement of scoring tool 112 can be accomplished by moving scoring device 103 toward or away from glass ribbon 60 (e.g., first surface 72) with first actuator 118, and fine control of scoring tool 112 can be accomplished by moving scoring tool 112 relative to body portion 110 with second actuator 120. At least one of first actuator 118 or second actuator 120 can be used to place scoring tool 112 in contact with glass ribbon 60 with sufficient force to produce score 114 as glass ribbon travels in draw direction 56 past scoring tool 112. In some embodiments, first actuator 118 can be used to bring scoring tool 112 near first surface 72, while second actuator 120 can be used to bring scoring tool 112 in contact with first surface 72 and apply a predetermined scoring force thereto. Second actuator 120 may be configured to produce a substantially constant scoring force from scoring tool 112 on first major surface 72. For example, scoring device 103 may include a force sensor in signal communication with a controller configured to vary the force applied by second actuator 120 and thereby maintain a constant force against glass ribbon 60. In further embodiments, first actuator 118 can be used to bring scoring tool 112 in contact with first surface 72, while second actuator 120 can be used to maintain a constant scoring force against first surface 72.

While scoring assembly 102 can be configured to move scoring tool 112 toward or away from glass ribbon 60, the scoring assembly generally does not move in a vertical direction, e.g., in draw direction 56. Thus, scoring tool 112 remains substantially vertically fixed during the scoring operation. As used herein, substantially vertically fixed means the scoring tool is not intentionally vertically moved during a scoring operation. Thus, relative motion between scoring tool 112 and glass ribbon 60 to produce score 114 is provided by movement of glass ribbon 60 as the glass ribbon is drawn downward in draw direction 56, for example by pulling rolls 64. In any event, scoring device 103 produces a score extending lengthwise along the glass ribbon a predetermined distance from first lateral edge 76. As used herein, the term "inboard" of the score will be used to refer to a direction extending from a reference point (e.g., score 114) toward a longitudinal center line of the ribbon (a center line extending along the length of the ribbon midway between first lateral edge 76 and second lateral edge 78), whereas the term "outboard" of the score refers to a direction extending from the reference point toward first lateral edge 76. Thus, if the reference point is the first lateral edge, score 114 is produced inboard of first lateral edge 76.

Edge portion separation assembly 100 may further comprise backing roller 104 arranged opposite scoring tool 112 and rotatable about axis of rotation 122 (see FIG. 7), wherein backing roller 104 acts as a back support (e.g., anvil) to glass ribbon 60 and exerts a reaction force against second major surface 74 equal to and directly opposite the scoring force applied by scoring tool 112. Thus, glass ribbon 60 is supported by backing roller 104 and prevented from moving in response to the scoring force applied to first major surface 72 by scoring tool 112. In the present context, arranged opposite means contact between the scoring tool and the glass ribbon is at the same vertical and horizontal position as contact between the backing roll and the glass ribbon, but on the opposite side of the glass ribbon.

While scoring assembly 102 is described above as comprising a mechanical scoring tool, in alternative embodiments, scoring assembly 102 may comprise a laser that directs a laser beam to impinge on the glass ribbon surface, heating the glass ribbon and forming a stress that produces a crack in the glass ribbon surface, the crack extending lengthwise along the glass ribbon as the glass ribbon travels in the draw direction. In such instances, a backing roller may be unnecessary.

Edge portion separation assembly 100 may further comprise a pair of stabilizing rollers 106a and 106b. Stabilizing rollers 106a and 106b are rotatable about axes of rotation 124a and 124b, respectively, and arranged to pinch glass ribbon 60 between the opposing stabilizing rollers, thereby stabilizing a position of glass ribbon 60 as scoring tool 112 is applied to first major surface 72. That is, first stabilizing roller 106a can be arranged to contact first major surface 72 of glass ribbon 60 and second stabilizing roller 106b can be arranged to contact second major surface 74 of glass ribbon 60. In various embodiments, axes of rotation 124a and 124b can be parallel to one another. In addition, axes of rotation 124a and 124b can be perpendicular to draw direction 56.

Both stabilizing rollers 106a, 106b contact glass ribbon 60 at the same vertical and horizontal position directly opposite each other with a gap therebetween sized to receive glass ribbon 60. Stabilizing rollers 106a, 106b may be free-wheeling rollers (undriven), although in further embodiments, one or both of the stabilizing rollers may be driven rollers. Stabilizing rollers 106a and 106b can be positioned downstream from scoring assembly 102, e.g., downstream of backing roller 104. While not shown, stabilizing rollers 106a and 106b may be individually moveable relative to draw plane 62 so pinch force on the glass ribbon can be controlled, for example to a predetermined value. For example, the gap between the stabilizing rollers can be narrowed or widened. Additionally, the ability to move at least one of the stabilizing rollers away from the draw plane can facilitate initial threading of the glass ribbon between the stabilizing rollers. Once threaded, at least one of the stabilizing rollers can be moved to apply a predetermined pinch force against the respective surface of the glass ribbon. For example, at least one of the stabilizing rollers 106a or 106b may be coupled to an actuator configured to move the respective stabilizing roller toward or away from the draw plane (e.g., glass ribbon 60). In some embodiments, each stabilizing roller can be coupled to an actuator configured to move the respective stabilizing roller toward or away from the draw plane. In either case, the glass ribbon is captured between the stabilizing rollers with a predetermined pinch force.

Figure 8:
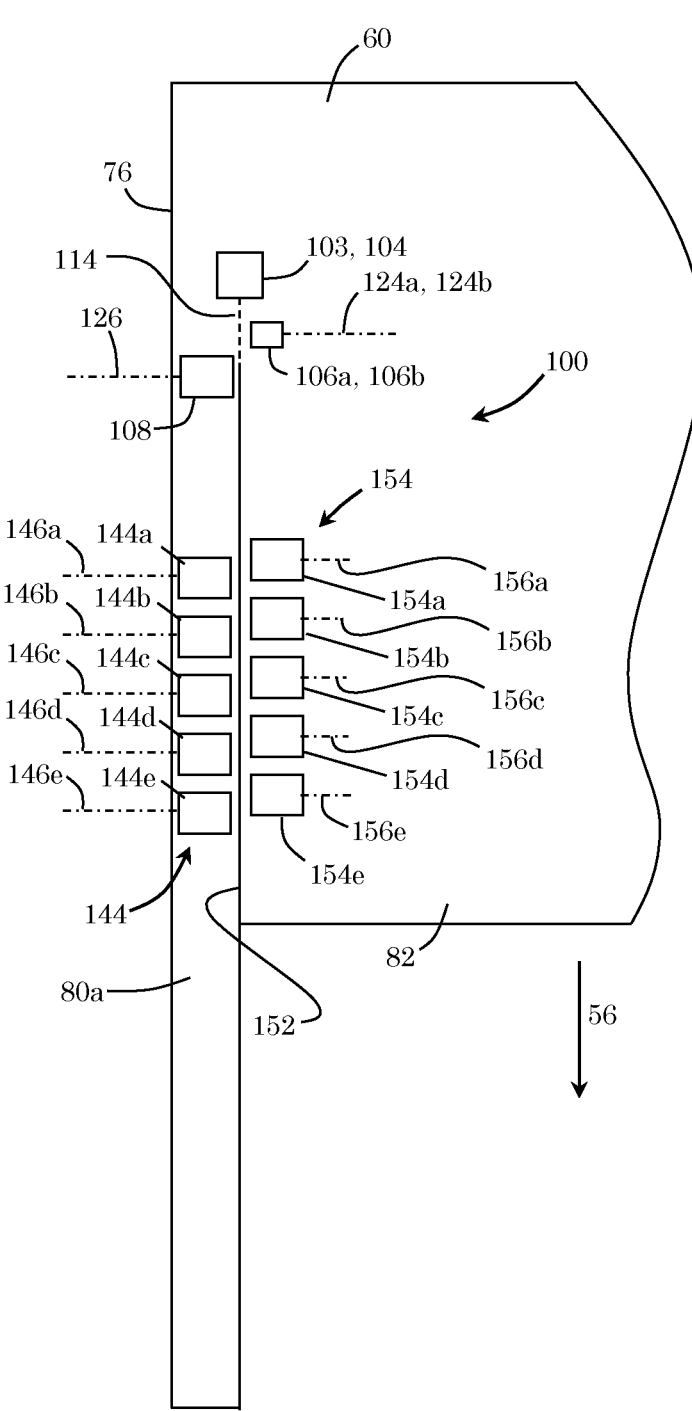
FIG. 8 is a front view of a glass ribbon and showing relative placement of various components of the edge portion separation assembly relative to the glass ribbon.

Edge portion separation assembly 100 may further comprise a separation roller 108 arranged downstream of scoring assembly 102, e.g., downstream of backing roller 104, and rotatable about an axis of rotation 126. In some embodiments, axis of rotation 126 can be parallel with draw plane 62 such that a surface of separation roller 108 is canted relative to the draw plane. However, in further embodiments, axis of rotation 126 may be non-parallel with draw plane 62. Separation roller 108 can be configured to apply a separation force against first major surface 72 outboard of score 114, i.e., against first edge portion 80a. The separation force applied to first edge portion 80a by separation roller 108 can produce a tensile stress across score 114 that drives a crack at the score through a complete thickness of glass ribbon 60, thereby separating first edge portion 80a from glass ribbon 60, e.g., below scoring tool 112. In other words, the separation force applied by separation roller 108 has the effect of bending first edge portion relative to central portion 82, and that bending develops tensile stress across score 114. In addition, or alternatively, separation roller 108 may be barrel-shaped, i. e., have a curved surface comprising a curvature orthogonal to a circumference of the separation roller (see FIG. 6). That is, the circumference of the separation roller may vary along a length of the separation roller. In some embodiments, the maximum circumference of separation roller 108 may be positioned near a center of the separation roller (midway between opposing ends of the roller). As shown in FIG. 8, separation roller 108 may be positioned downstream of stabilizing rollers 106a, 106b such that a horizontal plane in which axis of rotation 126 lies is positioned below a horizontal plane in which the axes of rotation 124a, 124b of stabilizing rollers 106a and 106b lie. Separation roller 108 may be a free-wheeling (undriven) roller.

In some embodiments, separation roller 108 may be coupled to an actuator capable of moving the separation roller closer to or farther from draw plane 62. For example, separation roller 108 may be coupled to an actuator that moves separation roller 108 toward or away from draw plane 62. Separation roller 108 may be coupled to a slide coupled to the actuator, wherein the actuator moves the separation roller along the slide between a first direction toward draw plane 62, such as into contact with glass ribbon 60, to a second direction away from draw plane 62, thereby removing separation roller 108 from contact with glass ribbon 60.

Figure 9A:
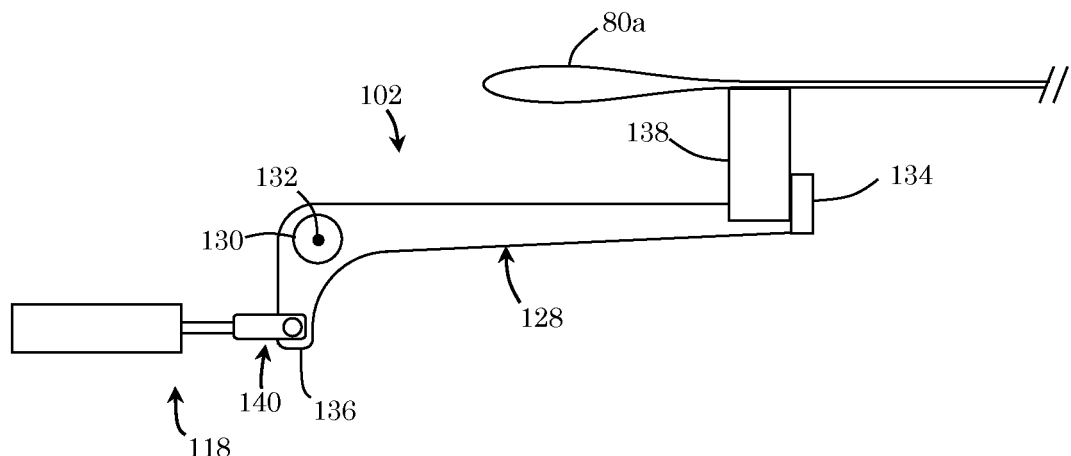
FIGS. 9A and 9B are a schematic views of a rotatable arm configured to move a component of the edge portion separation assembly toward or away from the glass ribbon by rotating the arm with an actuator.
Figure 9B:
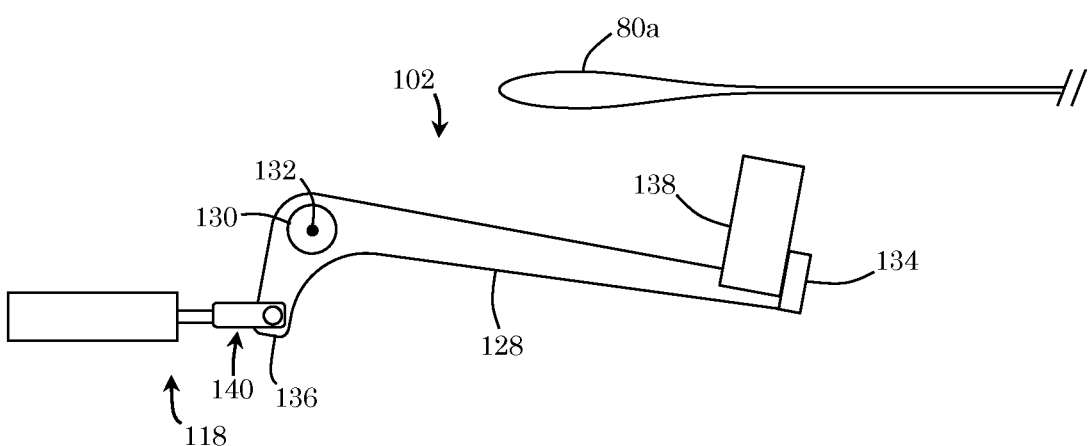

In some embodiments, scoring assembly 102 can include one or more rotatable arms that utilize rotational motion to move components of the scoring assembly toward or away from glass ribbon 60. For example, as depicted in FIGS. 9A and 9B, a rotatable arm 128 can be mounted on a suitable shaft 130 and arranged to rotate about an axis of rotation 132, for example a vertical axis of rotation, in a plane orthogonal to draw plane 62. Rotatable arm 128 can be configured such that shaft 130 forms a fulcrum. Accordingly, rotatable arm 128 comprises a first end 134 and a second end 136 opposite first end 134, with shaft 130 (and axis of rotation 132) positioned between first end 134 and second end 136. Shaft 130 may extend through a suitably sized passage in rotatable arm 128. FIGS. 9A and 9B depict a generic device 138 coupled to rotatable arm 128 at first end 134 and first actuator 118 coupled to rotatable arm 128 at second end 136. Generic device 138 can be any one of scoring device 103, backing roller 104, stabilizing rollers 106a and 106b, and/or separation roller 108. As previously described, first actuator 118 can comprise, for example, a pneumatic actuator, e.g., a pneumatic piston, a linear motor, or other suitable mechanism, movable from a first position, e.g., an extended position in the embodiment illustrated in FIG. 9A, wherein generic device 138 (e.g., scoring tool 112) is moved closer to first major surface 72 by rotation of rotatable arm 128 about axis of rotation 132 in a first rotational direction, for example contacting first major surface 72, and a second position, e.g., a retracted position in the embodiment illustrated in FIG. 9B, wherein the generic device is moved away from first major surface 72 by rotation of rotatable arm 128 about axis of rotation 132 in a second rotational direction opposite the first rotational direction. First actuator 118 can be coupled to rotatable arm 128 by hinged coupling 140 allowing rotation between first actuator 118 and rotatable arm 128.

Figure 10:
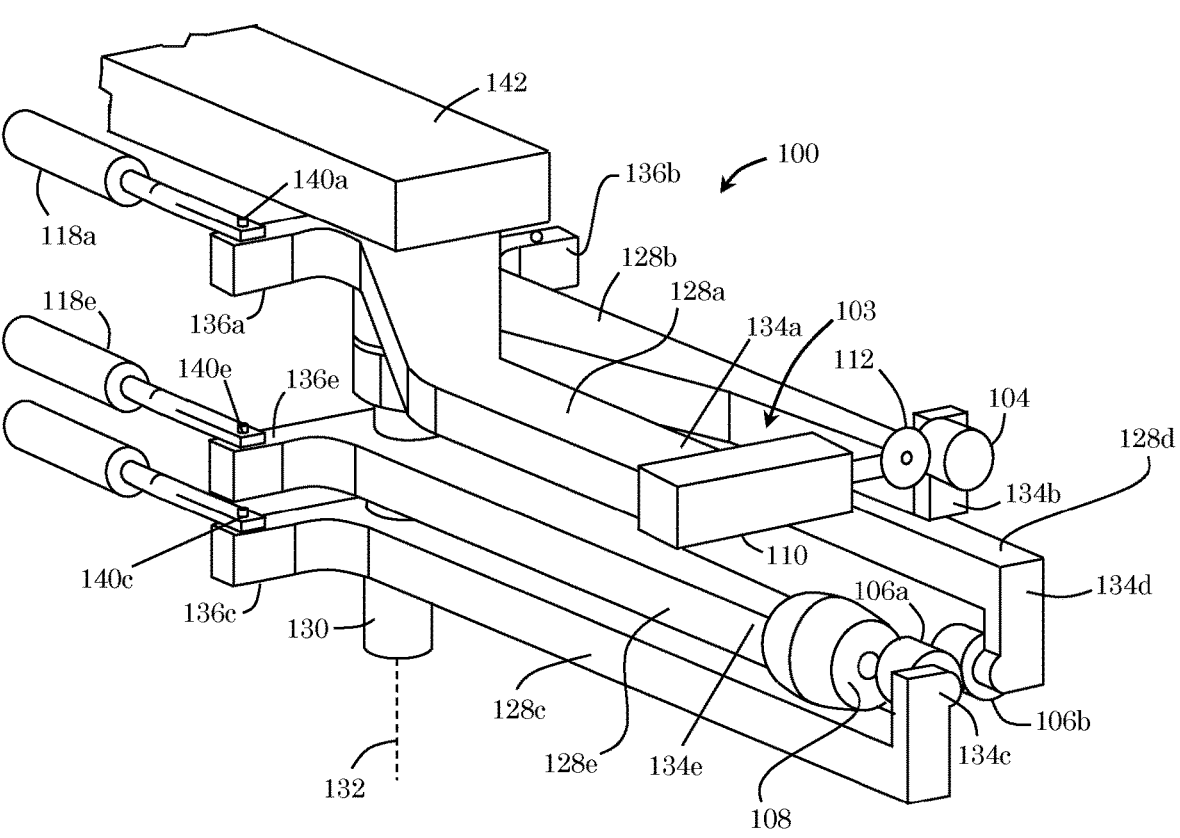
FIG. 10 is a perspective view of a portion of an exemplary embodiment using rotatable arms to move components of the edge portion separation assembly toward or away from the glass ribbon by rotating the respective arm with an actuator.

FIG. 10 depicts an exemplary embodiment of a portion of an edge portion separation assembly 100 wherein various components of the assembly are arranged on rotatable arms. For example, in accordance with various embodiments, the edge portion separation assembly can comprise a first rotatable arm 128a comprising a first end 134a and a second end 136a. First rotatable arm 128a is rotatably coupled to shaft 130, wherein shaft 130 is in turn supported by support member 142. Scoring device 103 can be attached to first end 134a and an actuator 118a can be coupled to second end 136a, for example by hinged coupling 140a. Actuator 118a can be configured to rotate first arm 128a about shaft 130 from a first position wherein scoring tool 112 is placed in contact with glass ribbon 60 (e.g., first major surface 72) and a second position wherein scoring tool 112 is removed from contact with glass ribbon 60.

Also shown is a second rotatable arm 128b comprising a first end 134b and a second end 136b, second rotatable arm 128b rotatably coupled to shaft 130 between first end 134b and second end 136b. Backing roller 104 is rotatably coupled to second rotatable arm 128b at first end 134b. While not shown, an actuator can be coupled to second end 136b and configured to rotate second rotatable arm 128b about shaft 130 from a first position wherein backing roller 104 is placed in contact with glass ribbon 60 (e.g., second major surface 74) and a second position wherein the backing roller is removed from contact with glass ribbon 60.

Also shown is third rotatable arm 128c comprising a first end 134c and a second end 136c opposite first end 134c. Third rotatable arm 128c is rotatably coupled to shaft 130 between first end 134c and second end 136c. A first stabilizing roller 106a can be rotatably coupled to third rotatable arm 128c at first end 134c. An actuator 118c can be attached to second end 136c, e.g., with hinged coupler 140c, and configured to rotate third rotatable arm 128c about shaft 130 from a first position wherein first stabilizing roller 106a can be placed in contact with glass ribbon 60 (e.g., first major surface 72) and a second position wherein first stabilizing roller 106a is removed from contact with glass ribbon 60.

Also shown is a fourth rotatable arm 128d comprising a first end 134d and, while not visible in the figure, a second end opposite first end 134d. Fourth rotatable arm 128d is rotatably coupled to shaft 130 between first end 134d and the second end. A second stabilizing roller 106b can be rotatably coupled to fourth rotatable arm 128d at first end 134d. While not shown, an actuator can be attached to the second end e.g., with a hinged coupler, and configured to rotate fourth rotatable arm 128d about shaft 130 from a first position wherein second stabilizing roller 106b can be placed in contact with glass ribbon 60 (e.g., second major surface 74) and a second position wherein the second stabilizing roller is removed from contact with glass ribbon 60.

Also shown is a fifth rotatable arm 128e comprising a first end 134e and a second end 136e opposite first end 134e. Fifth rotatable arm 128e is rotatably coupled to shaft 130 between first end 134e and second end 136e. Separation roller 108 can be rotatably coupled to fifth arm 128e at first end 134e. An actuator 118e can be attached to second end 136e, e.g., with hinged coupler 140e, and configured to rotate fifth rotatable arm 128e about shaft 130 from a first position wherein separation roller 108 can be placed in contact with glass ribbon 60 (e.g., first major surface 72 at first edge portion 80a) and a second position wherein the separation roller is removed from contact with first edge portion 80a.

Figure 5:
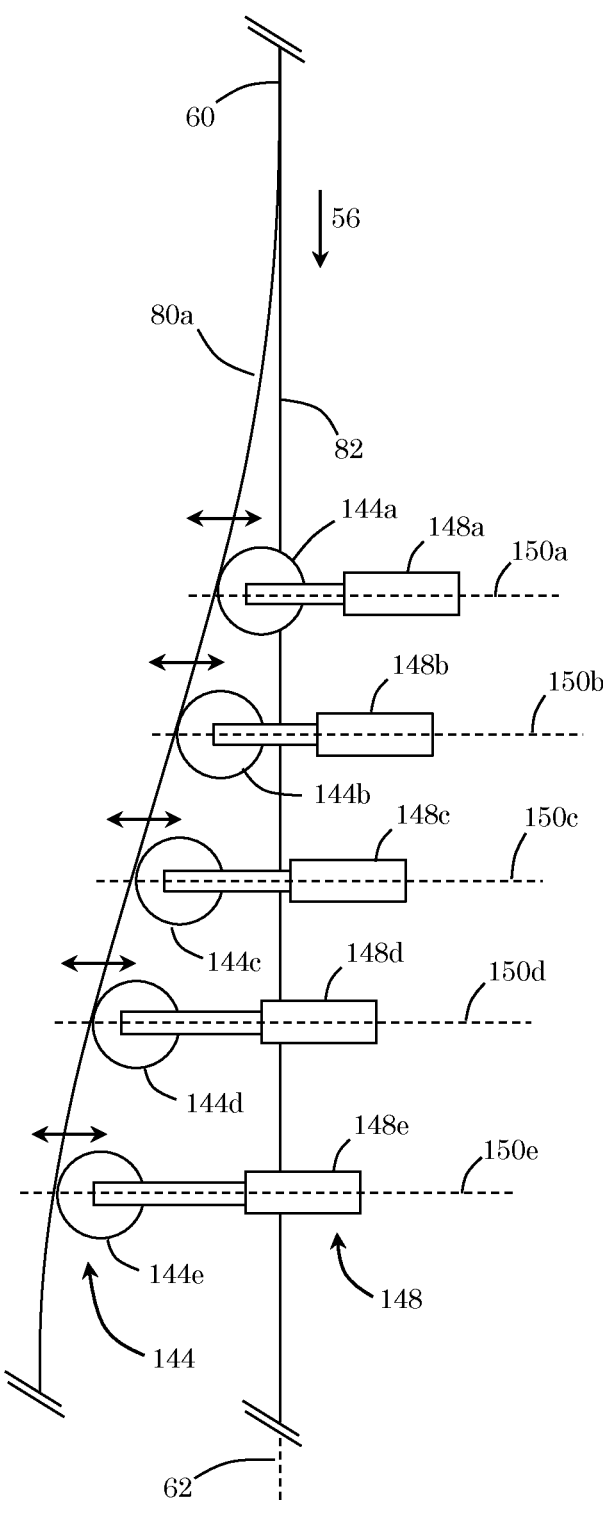
FIG. 5 is a schematic view of a plurality of edge portion guide rollers configured to divert a separated edge portion away from the central portion of the glass ribbon.

As best seen in FIGS. 4 and 5, edge portion separation assembly 100 may still further comprise a first plurality of guide rollers 144, e.g., edge portion guide rollers 144a-e rotatable about respective axes of rotation 146a-e (see FIG. 7), the edge portion guide rollers positioned downstream of separation roller 108 and arranged to contact and guide separated first edge portion 80a away from central portion 82 of glass ribbon 60 as the edge portion is removed from glass ribbon 60. While five edge portion guide rollers are shown in FIGS. 4, 5, 7, and 8, in other embodiments there may be less than five edge portion guide rollers or more than five edge portion guide rollers, for example one edge portion guide roller, two edge portion guide rollers, three edge portion guide rollers, four edge portion guide rollers, six edge portion guide rollers, and so forth. Edge portion guide rollers 144 can be arranged such that each successive edge portion guide roller along draw direction 56 is positioned below a preceding edge portion guide roller. Each successive edge portion guide roller can be offset along a guide axis toward or away from draw plane 62 (e,g., orthogonal to draw direction 56 and draw plane 62) from a preceding edge portion guide roller. Thus, first edge portion 80a can be gradually guided away from glass ribbon 60 (e.g., central portion 82) along a travel path different than a travel path traveled by central portion 82 as the edge portion is separated from central portion 82. Edge portion guide rollers 144 can be coupled to respective actuators 148, e.g., actuators 148a-e, configured to move the respective edge portion guide rollers 144a-e along respective guide axes 150a-e, thereby setting a travel path for first edge portion 80a after separation from central portion 82 Accordingly, in some embodiments, actuators 148 can be arranged to move first edge portion 80a closer to or farther from draw plane 62 and central portion 82 of glass ribbon 60, as indicated by the double-headed arrows in FIG. 5. Each axis of rotation of the plurality of axes of rotation 146a-e can be parallel to another edge portion guide roller axis of rotation 146a-e. By diverting separated first edge portion 80a away from central portion 82, contact between the newly formed outer edge surface 152 of central portion 82 and first edge portion 80a that could damage central portion 82, for example the newly formed outer edge surface of central portion 82, can be avoided. Edge portion guide rollers 144 can be free-wheeling (undriven) rollers.

Figure 6:
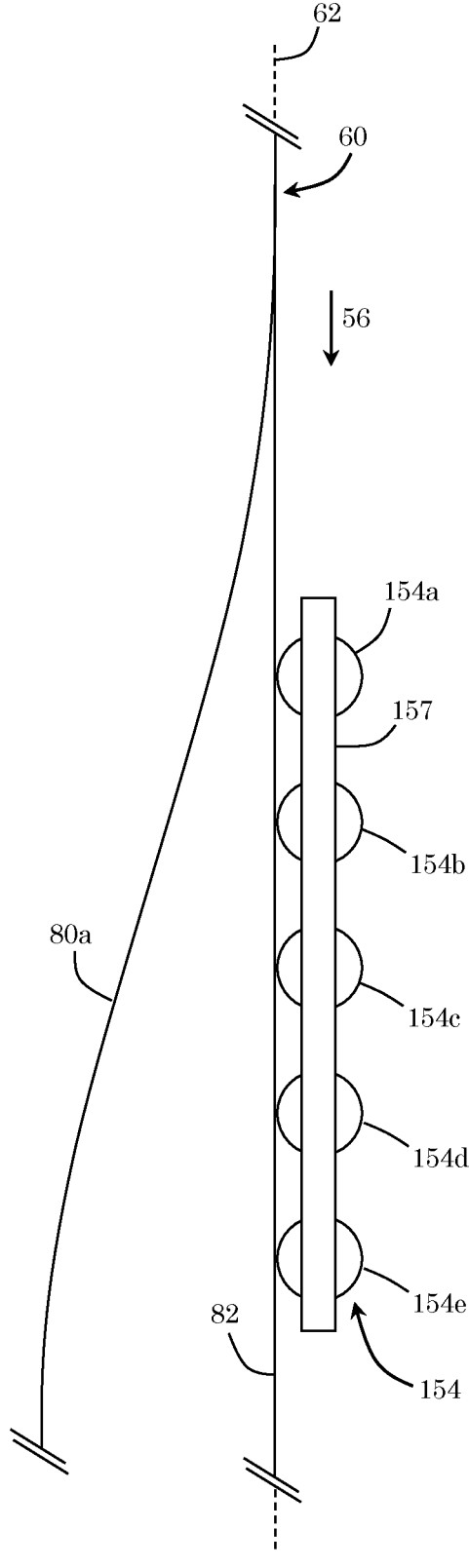
FIG. 6 is a schematic view of a plurality of central portion guide rollers configured to stabilize and guide a central portion of the glass ribbon after separation of the edge portion therefrom.

As depicted in FIGS. 4 and 6, edge portion separation assembly 100 may further comprise a second plurality of guide rollers 154, for example, central portion guide rollers 154a-154e rotatable about respective axes of rotation 156a-156e, positioned downstream of separation roller 108. Central portion guide rollers 154 are arranged to contact and guide central portion 82 of glass ribbon 60 after separation of the edge portion therefrom (edge portion guide rollers have been omitted for clarity in FIG. 6). While five central portion guide rollers 154 are shown in FIGS. 4 and 6, in other embodiments there may be less than five central portion guide rollers or more than five central portion guide rollers, for example one central portion guide roller, two central portion guide rollers, three central portion guide rollers, four central portion guide rollers, six central portion guide rollers, and so forth. Central portion 82 may be guided by central portion guide rollers 154 to downstream cross-cut scoring apparatus 70 configured to separate a glass sheet from glass ribbon 60, and more specifically from central portion 82. Central portion guide rollers 154 can be arranged vertically along and adjacent to draw plane 62 in draw direction 56, wherein a successive central portion guide roller 154 is positioned below a preceding central portion guide roller 154 (e.g., central portion guide roller 154*b* can be positioned below central portion guide roller 154*a*). Thus, central portion guide rollers can be arranged in a vertically aligned array. Central portion guide rollers 154 may be positioned to contact central portion 82 directly inboard of and adjacent the newly formed outer edge surface 152 thereof. In some embodiments, central portion guide rollers 154 may be rotatably coupled to a common frame 157 and movable as a group by one or more actuators. However, while not shown, central portion guide rollers 154 may be individually coupled to respective actuators similar to edge portion guide rollers 144 so the central portion guide rollers 154 can be individually positioned to provide an appropriate travel path for central portion 82 into cross-cut scoring apparatus 70.

Referring back to FIG. 4, first edge portion 80*a* can be directed by edge portion guide rollers 144 to a collection vessel 158, for example a bin or other suitable container. First edge portion 80*a* may be further guided into collection vessel 158 by a chute 160. For example, edge portion guide rollers 144 can be used to guide first edge portion 80*a* into chute 160, wherein chute 160 guides the first edge portion to collection vessel 158. First edge portion 80*a* may be broken into smaller portions, either by contact with inner surfaces of chute 160, by contact with collection vessel 158, or by contact with the contents therein. However, other mechanical methods may be used to break the separated edge portion into smaller portions, if needed. The glass collected in collection vessel 158 (hereafter cullet 162) can be reused. For example, cullet 162 collected in collection vessel 158 can be combined with the raw (batch) materials 24 and sourced back into melting vessel 14.

Figure 7:
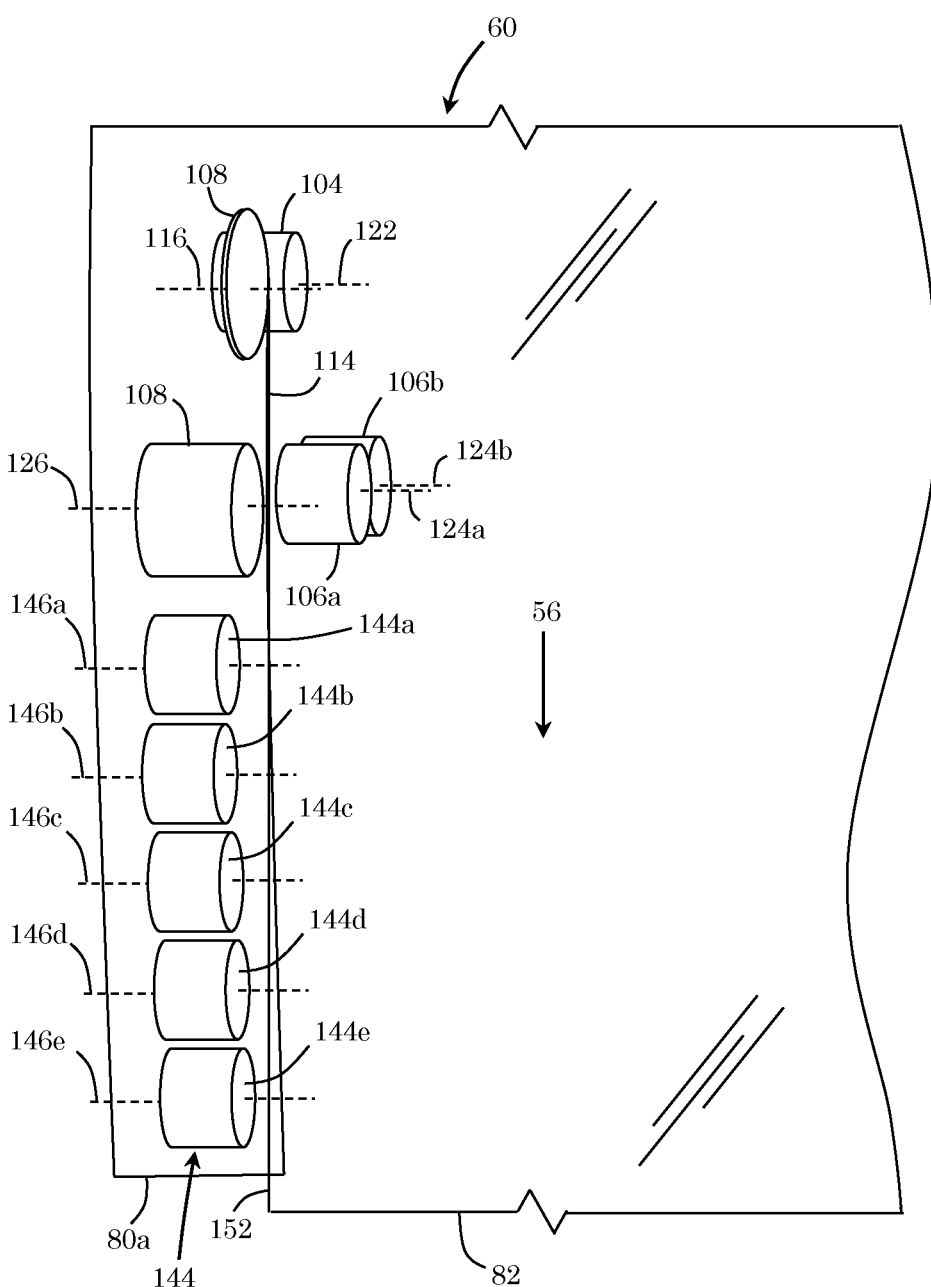
FIG. 7 is a perspective view of various components of the edge portion separation assembly showing relative placement of the components relative to the glass ribbon.

FIG. 7 is a perspective view of an exemplary edge portion separation assembly 100 comprising scoring tool 112, e.g., a scoring wheel rotatable about axis of rotation 116 and configured to produce score 114 in first major surface 72, and a backing roller 104 opposite scoring tool 112 and positioned adjacent second major surface 74, backing roller 104 rotatable about axis of rotation 122. Body portion 110 of scoring device 103 is omitted to provide a clearer view of scoring tool 112 and its arrangement relative to backing roller 104. In embodiments, axis of rotation 116 of scoring tool 112 may be parallel to axis of rotation 122 of backing roller 104 and arranged in a vertical position equal to the vertical position of axis of rotation 122, relative, for example, to root 58. Axis of rotation 116 can be parallel with draw plane 62.

FIG. 7 also depicts stabilizing rollers 106*a*, 106*b* positioned vertically downstream of scoring tool 112 and arranged such that first stabilizing roller 106*a* is positioned adjacent first major surface 72 and a second stabilizing roller 106*b* is positioned adjacent second major surface 74 opposite first stabilizing roller 106*a*. In various embodiments, axis of rotation 124*a* is parallel to and arranged in a vertical position equal to the vertical position of axis of rotation 124*b*.

FIG. 7 further shows separation roller 108 rotatable about axis of rotation 126 and arranged to apply a separation force against first edge portion 80*a*, i.e., outboard of score 114. In some embodiments, axis of rotation 126 can be parallel to either one or both axis of rotation 124*a* or axis of rotation 124*b*. However, in other embodiments, axis of rotation 126 can be nonparallel with axis of rotation 124*a* and/or axis of rotation 124*b*. For example, axis of rotation 126 can be canted at a non-zero angle relative to draw plane 62 such that axis of rotation 126 intersects draw plane 62. A cant in axis of rotation 126 relative to draw plane 62 can result in increased tensile force applied across score 114.

Also shown in FIG. 7 is the first plurality of edge portion guide rollers 144 (e.g., 144*a*-144*e*), each edge portion guide roller rotatable about a respective axes of rotation (e.g., 146*a*-146*e*). Axes of rotation 146*a*-146*e* may be parallel with draw plane 62. Center portion guide rollers 154 have been omitted from FIG. 7 for clarity.

FIG. 8 is a front view of glass ribbon 60 showing placement of the various components of edge portion separation assembly 100, including scoring device 103 and backing roller 104, stabilizing rollers 106*a*, 106*b*, separation roller 108, edge portion guide rollers 144 (e.g., 144*a*-144*e*) and center portion guide rollers 154 (e.g., 54*a*-154*b*).

Returning to FIG. 4, forming apparatus 48 may include glass separation apparatus 70 configured to separate a glass sheet 68 from glass ribbon 60. More specifically, separation apparatus 70 is a cross-cut glass separation apparatus configured to separate a glass sheet from central portion 82 after the edge portions have been removed from the central portion.

Figure 11:
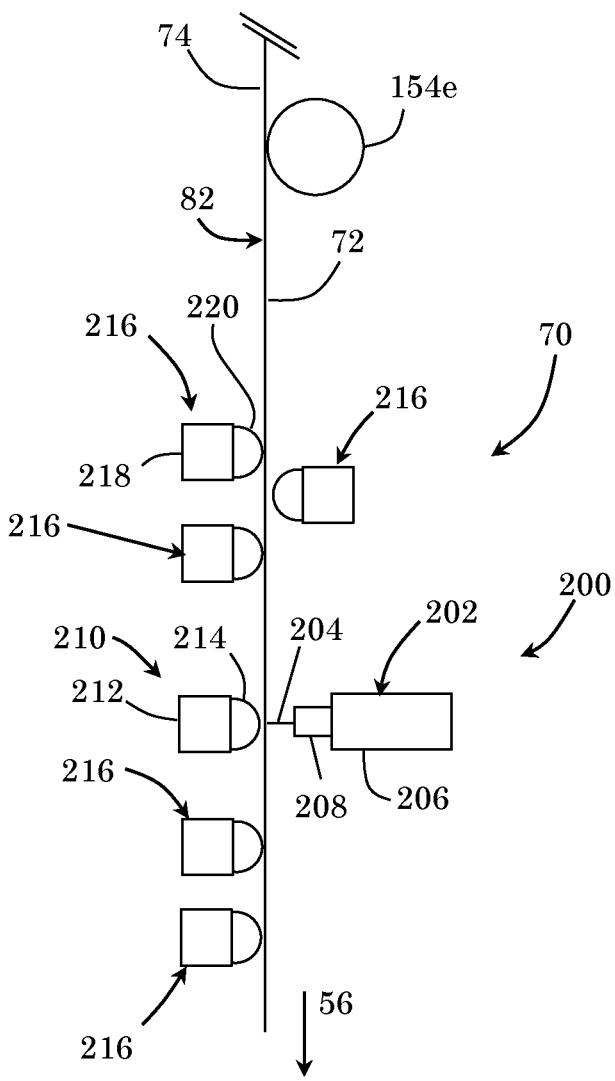
FIG. 11 is a schematic view of a cross-cutting apparatus configured to separate glass sheets from the central portion of the glass ribbon after separation of the edge portions from the central portion.

Referring to FIG. 11, in various embodiments, cross-cut glass separation apparatus 70 comprises a second scoring assembly 200 configured to score central portion 82 across a width of the central portion along a scoring axis orthogonal to draw direction 56. For example, second scoring assembly 200 may be coupled to a rail or other member along which second scoring assembly 200 can be driven by a suitable drive apparatus.

Second scoring assembly 200 includes a second scoring device 202. Second scoring device 202 can comprise second scoring tool 204 coupled to a body 206, second scoring device 202 configured to produce a score in first major surface 72 of central portion 82, orthogonal to draw direction 56 as central portion 82 descends from root 58. For example, second scoring tool 204 may comprise a mechanical score wheel or scriber, for example a diamond or carbide scriber. In embodiments, second scoring tool 204 may be coupled to body 206 by an actuator 208 arranged to move second scoring tool 204 toward or away from first surface 72. Second scoring assembly 200 may further comprise a backing member 210 arranged opposite second scoring tool 204, wherein backing member 210 comprises a support member 212 and a resilient nosing 214, for example a polymer ribbon having a hardness selected to prevent damage to glass ribbon 60 if contacted by the polymer material. Backing member 210 is configured to support central portion 82 and prevent movement of central portion 82 in response to the scoring force applied by second scoring tool 204 against first major surface 72. Accordingly, as second scoring tool 204 is pressed against first major surface 72, backing member 208 provides a counterforce to the applied scoring force against second major surface 74.

In various embodiments, one or more nosing assemblies 216 may be used to stabilize central portion 82 during the scoring operation. In some embodiments, each nosing assembly 216 can comprise a support member 218 and a resilient nosing member 220 coupled to the support member. For example, in some embodiments, support member 218 can comprise an elongate metal member and nosing member 220 can be a polymer ribbon, the polymer ribbon having a hardness selected to prevent damage to glass ribbon 60 if contacted by the polymer material.

In various embodiments, cross-cut glass separation apparatus 70 may be mounted on a gantry configured to move in the draw direction at a speed matching the speed of glass ribbon 60. Thus, no relative motion occurs between second scoring device 202 and glass ribbon 60 during a scoring operation. Accordingly, scoring device moves downward at the draw speed (speed of the moving glass ribbon) while the scoring device moves laterally, e.g., horizontally, across the width of central portion 82, thereby scoring the central portion, for example across the entirety of the width. Second scoring device 202 may, for example, be mounted on a carriage assembly coupled to the gantry, wherein during the scoring operation the carriage assembly, and the scoring device, traverses the width W1 of the central portion.

As shown in FIG. 1, cross-cut glass separation apparatus 70 may further comprise at least one robot 300 comprising a robot arm 302 and a glass handling tool 304 coupled to robot arm 302. Glass handling tool 304 comprises a central cross-member 306 to which a distal end of robot arm 302 is coupled, with engagement arms 308a, 308b coupled thereto at opposing ends of cross-member 306. One or both engagement arms 308a, 308b can be configured to extend, outward from cross-member 306. For example, at least one engagement arm may be movable in a direction parallel to cross-member 306. In reference to FIG. 1, two engagement arms are shown, wherein at least one engagement arm is movable in a direction toward (and away from) the opposite engagement arm by way of an actuator coupled to the engagement arm and to the cross-member. The engagement arms can include suction cups 310 in communication with a source of vacuum to assist in engaging with and holding a glass article (e.g., glass ribbon or glass sheet).

As glass ribbon 60 descends from root 58 and cools, the glass ribbon is captured between stabilizing rollers 106a and 106b. For example, a gap between the stabilizing rollers can be reduced by actuating at least one of the stabilizing rollers using a coupled actuator, thereby pinching central portion 82 between the stabilizing rollers. Meanwhile, backing roller 104, located above the first and second stabilizing rollers, is actuated, bringing backing roller 104 into contact with second major surface 74. Additionally, scoring device 103 is actuated, bringing first scoring tool 112 into contact with first major surface 72 with a predetermined scoring force. Actuation of scoring device 103 may be accomplished with actuator 118 and/or second actuator 120. As a result, first scoring tool 112 produces score 114 in first major surface 72 long a path parallel with draw direction 56 as glass ribbon 60 moves downward relative to scoring tool 112. Separation roller 108 is actuated, bringing separation roller 108 into contact with first edge portion 80a. Separation roller 108 is pressed against first edge portion 80a with sufficient force that a tensile force is formed across score 114, driving a crack through the thickness of the glass ribbon and separating first edge portion 80a from central portion 82 below first scoring tool 112.

As glass ribbon 60 continues to descend, first edge portion 80a below the contact point of first scoring tool 112 and glass ribbon 60, now freed from central portion 82, is guided out of the draw plane by edge portion guide rollers 144. For example, actuators 148 can move the edge portion guide rollers so the edge portion guide rollers contact first edge portion 80a and bend first edge portion 80a out of draw plane 62 and away from the newly created outer edge surface 152 of central portion 82.

First edge portion 80a, joined to central portion 82 above the contact point of first scoring tool 112, continues descending and is captured by first cullet chute 160 and delivered to collection vessel 158.

At the completion of the score, robot arm 302 is moved to glass ribbon 60, wherein glass handling tool 304 is placed in contact with first major surface 72. Suction cups 310 are provided with a vacuum and the suction cups grip first major surface 72. Actuator(s) extend the at least one movable engagement arm outward, away from the opposite engagement arm, thereby tensioning central portion 82 of the glass ribbon below the lateral score and flattening the central portion. Robot 300 tilts robot arm 302, bending central portion 82 and forming a tensile stress across the score to drive a crack through the thickness of the central portion until glass sheet 68 is separated from central portion 82. The robot then moves the separated glass sheet to a receiving station and prepares to receive a subsequent glass sheet.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What it claimed is:

1. A method of separating an edge portion from a moving glass ribbon, comprising:

forming a glass ribbon with a forming apparatus, the glass ribbon moving along a draw path in a draw direction along a draw plane, the glass ribbon comprising a central portion having a first thickness, and a first edge portion including an outside edge of the glass ribbon, the first edge portion adjacent the central portion and comprising a second thickness greater than the first thickness;

scoring the glass ribbon with a scoring tool to form a score along a length of the glass ribbon extending in the draw direction a predetermined distance from the outside edge while supporting the glass ribbon with a backing roller, wherein the scoring tool forces the glass ribbon against the backing roller to produce the score between the scoring tool and the backing roller while the glass ribbon moves along the draw path in the draw direction;

pinching the central portion of the glass ribbon during the scoring between a pair of stabilizing rollers inboard of the score; and contacting the edge portion of the glass ribbon downstream of the scoring tool with a separation roller, the separation roller applying a force to the edge portion outboard of the score that forms a tensile stress across the score and causes the edge portion to separate from the central portion downstream of the scoring tool, thereby forming a separated edge portion.

2. The method of claim 1, further comprising contacting the separated edge portion with a first plurality of guide rollers and guiding the edge portion away from the central portion.

3. The method of claim 2, wherein the first plurality of guide rollers guide the separated edge portion into a chute.

4. The method of claim 3, wherein the chute directs the separated edge portion into a collection container.

5. The method of claim 2, further comprising contacting the central portion with a second plurality of guide rollers downstream of the separation roller.

6. The method of claim 5, further comprising cross-cutting the central portion after the edge portion is separated from the central portion to separate a glass sheet from the central portion.

7. The method of claim 1, wherein a surface of the separation roller is canted relative to the to the draw plane during the scoring.

8. The method of claim 1, further comprising cross-cutting the central portion orthogonal to the draw direction to separate a glass sheet from the glass ribbon.

9. The method of claim 8, wherein the cross-cutting occurs downstream from the contacting the edge portion with the separation roller.

10. The method of claim 8, wherein the cross-cutting comprises contacting the central portion with a second scoring device while the second scoring device translates in the draw direction at the same speed as the central portion.

11. The method of claim 8, further comprising engaging and holding the glass sheet with at least two pairs of suction cups provided with a vacuum on a correspond pair of engagement arms during the cross-cutting.

* * * * *